Jan. 26, 1971 R. M. TUCK 3,557,635
TRANSMISSION WITH PHASING CLUTCH FOR TORQUE CONVERTER ROTOR
Filed Nov. 6, 1968
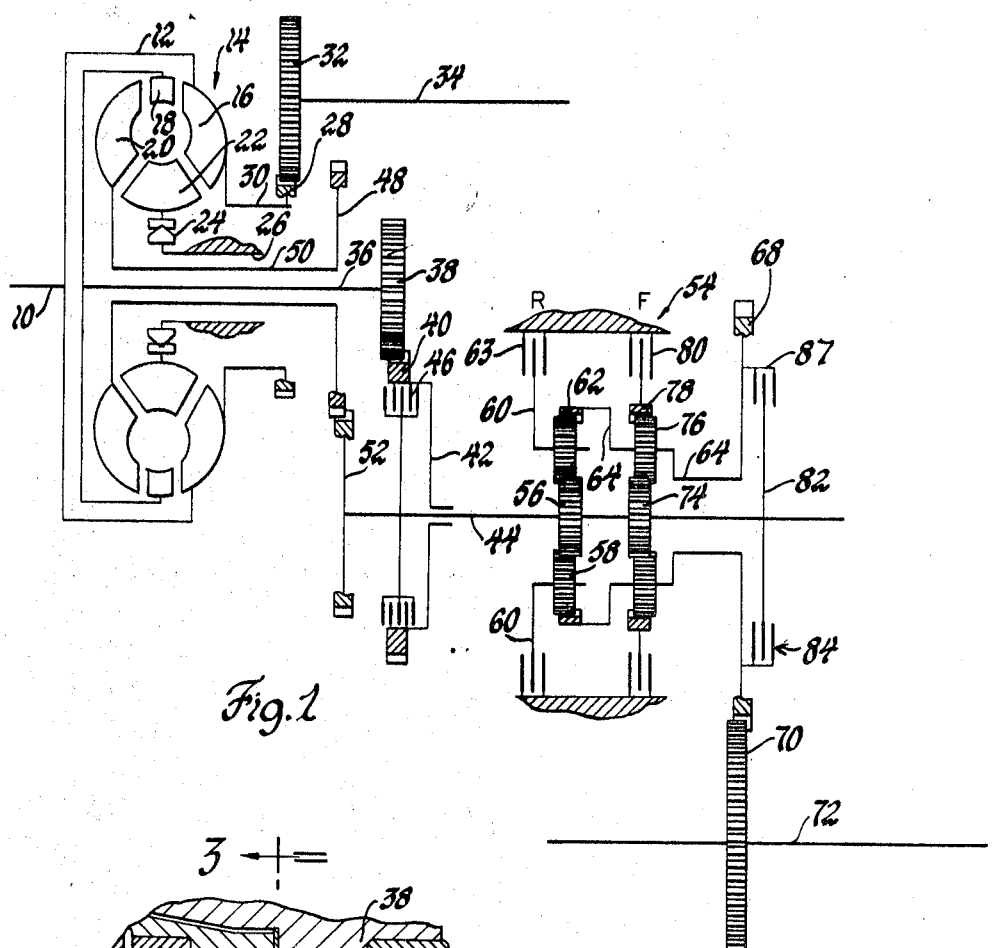
Fig. 1
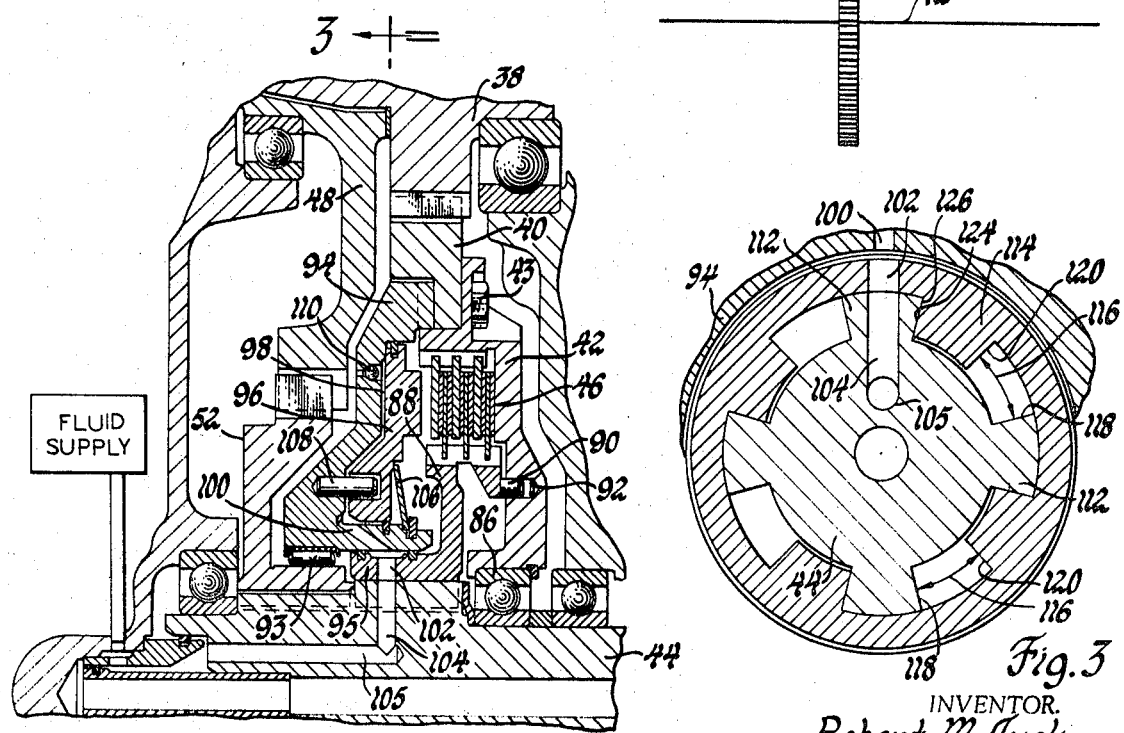
Fig. 2
Fig. 3
INVENTOR.
Robert M. Tuck
BY
Charles L. White
ATTORNEY

United States Patent Office 3,557,635
Patented Jan. 26, 1971

3,557,635
TRANSMISSION WITH PHASING CLUTCH FOR TORQUE CONVERTER ROTOR
Robert M. Tuck, Indianapolis, Ind., assignor to General Motors Corporation, Detroit, Mich., a corporation of Delaware
Filed Nov. 6, 1968, Ser. No. 773,811
Int. Cl. F16h *47/08;* F16c *43/21*
U.S. Cl. 74—731      7 Claims

ABSTRACT OF THE DISCLOSURE

Torque converter transmission having first and second turbines connected to associated gearsets, having different speed ratios for driving a power-combining shaft. A friction clutch, controlled by a fluid-operated motor which is triggered by a change in torque direction on the first turbine, is connected between the output of the first turbine gearset and the shaft. There is a fluid-flow control valve formed by the clutch hub and combining shaft which directs ample oil to the motor to effect clutch engagement when the first turbine and its driven gear tends to overrun the combining shaft. With the clutch engaged, both turbines drive the combining shaft to provide maximum input torque. When the combining shaft speed increases until the first turbine can no longer add torque, a further increase of combining shaft speed brings about a torque reversal and the valve moves to exhaust oil from the clutch motor so that the clutch disengages. Under these conditions only the second turbine drives the combining shaft to improve converter performance in the high speed ratios.

---

This invention relates to clutches for transmissions and more particularly to a phasing clutch and controls for coupling and uncoupling a torque converter rotor and a power transmitting member.

In operation of a working vehicle such as a shovel loader, torque converter transmissions with two different forward drive gear ratios are usually required; a high-torque gear ratio for crowding into the material to be loaded and a low-torque gear ratio for transporting the load.

In one of the more advanced transmissions for working vehicles, a twin turbine torque converter transmission providing a high stall torque ratio and also high speed efficiency is utilized. This transmission has sufficient coverage to satisfy the torque requirements for both crowding and transporting the load and provides advanced controls since only shifting in forward and reverse is necessary. In the twin turbine torque converter there are two separate turbines each connected by its own gearset to a power combining drive shaft.

In a first phase of operation a one-way device connects the drive of the first turbine to the output. During this phase the speed of the first turbine is always held below that speed at which it would rotate if free. This presence of differential speed denotes the presence of positive torque being delivered to the output. This speed differential varies from a maximum value at stall to zero at about ½ speed ratio. Thus the first turbine delivers maximum torque at stall and precesses to zero torque at about ½ speed ratio. The second turbine is directly connected by gearing to the output. At stall the fluid exiting from the first turbine passes freely through the blading of the second turbine so that the second turbine does not produce any forward drive. As the speed ratio increases from stall, the fluid flow begins to impinge the forward surfaces of the second turbine blading producing forward drive which is additive to the first turbine drive.

At about ½ speed ratio the first turbine reaches its free speed and the fluid flows freely through its blading to impinge on the blading of the second turbine. Thus at ½ speed ratio, and beyond, the second turbine provides all drive. Beyond ½ speed ratio the drive of the second turbine tends to overspeed the first turbine. Torque from the second turbine must proceed backwardly through the one way device to cause this overspeed. The backward torque causes the release of the one way clutch. Thus the first turbine rotates freely at above ½ speed ratio avoiding torque losses.

This invention is an improvement in transmissions such as the twin turbine transmission described above and involves a special clutch including controls responsive to converter operating conditions for phasing a rotor, such as the first turbine of the transmission described above, into and out of driving engagement with a power combining shaft. This invention may be utilized in place of the conventional one way clutch between the first turbine gearing and the power combining shaft. The clutch of this invention eliminates the need for selecting a particular type and size of one way clutch for a particular application since it has high capacity and great durability and effectively responds to torque converter operating conditions for connecting and disconnecting the turbine and the power combining shaft.

In this invention a multi-plate friction clutch pack is interposed between the gearing driven by the first turbine and power combining shaft. Clutch engagement and disengagement is triggered by a change in torque direction on the first turbine. If the first turbine can add torque then its driven gear tends to overrun the combining shaft to open a valve to effect clutch engagement. If the combining shaft increases in speed until the first turbine can no longer add torque, a further increase in speed of the combining shaft brings about a torque reversal and closes the valve to effect clutch disengagement.

In the preferred embodiment of the invention the drag of fluid between clutch plates splined to the first turbine output gear and the friction plates splined to the clutch hub responds to overdrive from the first turbine by rotating the hub in one direction relative to the power combining shaft. If desired, a tickler plunger between the hub of the output gear of the first turbine gearset and the hub of the clutch can be used to frictionally connect these two parts to provide for this relative rotation. This relative rotation operates a special valve member which connects a hydraulically operated clutch motor with a fluid pressure source. The motor then effects clutch plate engagement and both turbines can provide for torque multiplication.

When the first turbine ceases to overdrive the output and starts to be overdriven, the combining shaft is rotated relative to the clutch hub in an opposite direction so that the valve member effects the exhaust of pressure fluid from the motor. The clutch will then disengage and the first turbine will be disconnected from the combining shaft.

These and other features, objects and advantages of this invention will be apparent from the following detailed description and drawings in which:

FIG. 1 is a diagrammatic illustration of a torque converter transmission.

FIG. 2 is a sectional view of a portion of the transmission of FIG. 1 illustrating details of the phasing clutch and controls of this invention.

FIG. 3 is a view taken along the lines 3—3 of FIG. 2.

The transmission diagrammatically illustrated in FIG. 1 has a power plant driven input shaft 10 which is connected to drive a rotary cover 12 of a hydrodynamic torque converter 14. The torque converter includes a pump assembly 16 secured for rotation with the cover, a first turbine assembly 18, a second turbine assembly 20 and a stator 22. The stator is connected by one way brake 24 to a grounded sleeve shaft 26. A power take-off gear 28, connected to the pump assembly by a sleeve shaft 30, drives gear 32 and the power take-off shaft 34.

The turbine assembly 18 is connected through a drive shaft 36 to drive a first turbine gear 38 which meshes with gear 40 to provide a speed reducing gear ratio. Gear 40 has an inner hub 42 rotatively supported on shaft 44. A multi-plate friction clutch 46 is employed between gear 40 and intermediate drive shaft 44 to connect and disconnect the low speed ratio gearing and shaft 44. More details of this clutch construction will be described below in reference to FIGS. 2 and 3.

The second turbine assembly is connected to drive a gear 48 through a sleeve shaft 50. This latter gear meshes with the gear 52 and these gears provide a speed increasing ratio, preferably an overdrive. Gear 52 is rigidly fastened by splines to shaft 44.

When clutch 46 is applied, the torque developed by both turbines is routed to the intermediate shaft by the gears described above and is combined by this shaft. When clutch 46 is released, only the second turbine can drive the intermediate shaft through the power path provided by the speed increasing gearing.

The intermediate shaft provides the input to the two speed forward and reverse transmission unit 54. As illustrated in FIG. 1, the intermediate shaft drives the sun gear 56 of a first gearset, which gear meshes with the planetary pinions 58 rotatably mounted on a carrier 60. Pinions 58 also mesh with ring gear 62. The carrier may be retarded from rotation by application of a reverse brake 63 so that the sun gear rotating in one direction drives the ring gear in an opposite direction. This ring gear then drives a connected pinion carrier 64 of a second planetary gearset described below. Carrier 64 is also connected to drive the transfer drive gear 68 that meshes with a transfer drive gear 70 to which transmission output shaft 72 is securely coupled.

The intermediate shaft 44 also drives a sun gear 74 of the second planetary gearset which meshes with the pinions 76 rotatably mounted on the carrier 64. These pinions mesh with the ring gear 78. The ring gear may be held for reaction by engagement of a low brake 80 to provide for forward reduction drive of the output carrier 64 and the connected transfer gear 68. The intermediate shaft further drives a driving plate 82 of a high speed clutch 84 which has a driven hub 87 securely coupled to the transfer gear 68.

Transmission 54 is conditioned for high speed operation when only clutch 84 is engaged, for forward reduction drive when only brake 80 is engaged, and for reverse drive when only brake 63 is engaged.

Referring now to FIG. 2, there is shown the special construction for effecting the engagement and disengagement of clutch 46. In this figure, gear 40 has the gear hub 42 rigidly secured thereto by bolts 43, and this hub is rotatably mounted on the intermediate shaft 44 by antifriction bearings 86. The hub is internally splined to accommodate and drive the externally-tanged friction plates of the multi-plate friction clutch pack. The other plates, interleaved with the first mentioned plates, are internally tanged to drivingly fit between the splines of annular clutch hub 88. FIG. 3 shows the clutch hub connected to the shaft 44 by a special spline connection permitting limited relative rotation of these two parts which will be later described. A tickler plunger 90, supported in a bore in hub 42 is biased by a trapped coil spring 92 into a frictional engagement with an annular side surface of the clutch hub 88 to provide a frictional drag connection between clutch hub 88 and gear hub 42.

The gear 40 also carries an annular piston housing 94 fixed thereto which are an annular collar seated on a tubular valve portion 95 of the clutch hub 88. Anti-friction bearing 93 is disposed between the housing and the gear 52. There is an annular piston 96 slidably mounted in the piston housing which cooperates with the housing to provide hydraulic fluid pressure chamber 98. Passage 100 formed in the collar of the housing 94 communicates with the pressure chamber and this passage can be aligned with a passage 102 formed in the valve portion of clutch hub 88 for the purpose of conducting pressure fluid from a radial passage 104 in the shaft 44 connected to axial passage 105 to chamber 98 to effect the movement of piston 96 to the right in FIG. 2 and the frictional engagement of the plates of the clutch pack.

A cone disc spring 106 has its inner annular edge anchored to the hub by a snap ring and has an outer peripheral edge in contact against the inner face of the piston urging it to the left and a clutch release position. Pin 108 secured to the piston housing 94 and projecting into a bore in the piston prevents relative rotation between the piston and the housing. Ball dump valve 110 exhausts residual oil in the chamber 98 when the chamber is not charged with operating oil to prevent the buildup of pressure in this chamber. This valve closes when the chamber is charged with pressure oil.

FIG. 3 shows the valve mechanism for effecting the engagement and disengagement of the friction plates of clutch 46. Shafts 44 has external splines 112 which are received between the internal clutch hub splines 114 which are circumferentially spaced providing clearance to permit limited rotary movement between the clutch hub and the shaft permitting the clutch hub to act as a fluid control valve to control the supply and discharge of oil to and from chamber 98. This figure shows clearance 116 between the faces 120 of the clutch hub splines and the faces 118 of the shaft splines when the opposing faces 124 and 126 are engaged. In this illustrated position the clutch hub is in a position to align the passage 102 with passage 104 in the shaft, and oil is fed to chamber 98 by way of passage 100 to effect the movement of the piston and clutch engagement. A power path will thus be completed from the first turbine assembly to the shaft 44.

When the spline faces 118 and 120 are engaged, the clearance appears between faces 124 and 126. The passage 104 is blocked by the inner arcuate surface of the hub and pressure oil cannot reach chamber 98. Oil in chamber 98 is exhausted through passages 100 and 102 and through the clearance between faces 124 and 126 of splines 112 and 114 to an exhaust chamber.

Assuming the vehicle in which this transmission is utilized is stationary and it is desired to move a load, the transmission is conditioned for forward drive with clutch 80 engaged. In the converter most of the torque is routed to the first turbine gearing 38 and 40 and through the engaged clutch 46 to the intermediate shaft 44. This torque is then multiplied by the transmission gearing for driving the output shaft 72. As the vehicle picks up speed, torque developed by the second turbine steadily increases as the torque of the first turbine gradually diminishes. The torques of both turbines are combined by the intermediate shaft 44. As first turbine torque approaches zero and the second turbine is progressively developing more torque, the second turbine gearing 48 and 52 will drive the shaft 44 counterclockwise relative to the clutch hub through the arc provided by clearance 116 until spline faces 118 and 120 engage. When this occurs, oil supply passage 104 is blocked and the oil in the chamber 98 exhausts through passages 100 and 102 to the clearance between faces 124 and 126 of the splines and then to the exhaust chamber. The spring 106 then moves the piston to the FIG. 2 clutch release position. With clutch 46 released, the second turbine drives the intermediate shaft 44 alone and negative torque developed by the first turbine cannot subtract from the second turbine torque. The hydraulic transition from start to travel is automatic within the converter, smoothly phasing in the second turbine and the overdrive gear.

If we assume that an added drive load is imposed in excess of the maximum provided by the second turbine, then the speed ratio will drop below .5 and the first turbine will produce overdrive to clutch member 42. When the first turbine and gears 38 and 40 turn the gear hub 42 clockwise with respect to shaft 44, the drag between the clutch plates and between the tickler plunger 90 and the clutch hub 88 will effect the rotation of the clutch hub 88 back to the FIG. 3 position. At this time the passage 102 is again aligned with passage 104 and the piston 96 moves in response to pressure oil fed to chamber 98 to effect an engagement of clutch 46. The first turbine is then connected to the shaft 44. If the drag between the clutch plates is sufficient to effect the rotation of the clutch hub and shaft, the tickler plunger may be eliminated.

It will be appreciated that the construction shown is only illustrative of this invention. I wish it to be understood that the invention is not limited to the particular details of construction shown and described, for obvious modifications will occur to a person skilled in the art.

I claim:

1. In a power transmission, an input and an output, a hydrodynamic torque converter having a pump operatively connected to said input and having first and second turbine means and having a stator, first gearing means operatively connected to said first turbine means, second gearing means operatively connected to said second turbine means, power transmitting means drivingly connecting said second gearing means to said output, lost motion means for mounting said first gearing means for limited rotary movement on said power transmission means, fluid operated drive establishing means operatively connected to said first and second gearing means for establishing and disestablishing a drive from said first turbine means to said output through said power transmitting means, fluid source means providing a supply of operating fluid for said drive establishing means, and valve means for controlling the supply of operating fluid from said source means to said fluid operated drive establishing means and operatively connected to said first and second turbine means through said first and second gearing means and operative in response to predetermined torque produced by said first turbine means to permit the supply of fluid from said source means to said fluid operated drive establishing means to effect establishment of said drive so that said first and second turbine means drive said power transmission means in one direction and drive said output and positionable in response to a change in torque direction on said first turbine means to exhaust fluid from said drive establishing means and block the supply of fluid from said source means to said fluid operated drive establishing means to thereby effect disestablishment of said drive so that only said second turbine means drives said power transmission means in said one direction to drive said output.

2. The power transmission of claim 1, said valve means comprising first and second relatively movable valve elements operatively connected respectively to said first and second gearing means and operatively connected to said power transmitting means, said valve elements having coperating spline faces which drivingly contact each other in a first position in which said source means is hydraulically connected by said valve means to said drive establishing means to thereby effect the operation of drive establishing means to establish said drive from said first turbine means to said output, said spline faces of said valve elements being spaced from each other in a second position to form a fluid exhause passage from said drive establishing means, said valve elements blocking said source means in said second position to prevent said valve means from supplying operating fluid to said drive establishing means to thereby cause said drive establishing means to disestablish said drive from said first turbine means to said output.

3. The power transmission of claim 1, said first gearing means providing a speed reducing drive from said first turbine means to said output and said second gearing means providing a speed increasing drive from said second turbine means to said output, said fluid operated drive establishing means being a fluid operated multi-plate friction clutch engageable to drivingly connect said first turbine means to said power transmitting means, said valve means having first and second splined parts relatively movable between a first relative position in which said splines of said parts are drivingly engaged for admitting the supply of said fluid to said clutch to effect the establishment of said drive and a second relative position in which said splines are spaced for blocking the supply of said fluid to said clutch and to form an exhaust passage for exhausting fluid therefrom to disengage said clutch and effect the disestablishment of said drive, and friction means for drivingly connecting the output of said speed reducing drive to said first of said valve parts when said friction clutch is disengaged.

4. In a power transmission, an input member and an output member, first power transmitting means driven by said input member, second power transmitting means driven by said input member, a transmission member operatively connected to said second power transmitting means and to said transmission output member, clutch means operatively connected to said first power transmitting means and to said transmission member, said clutch means having friction members which are engageable to drivingly connect said first power transmission means and said transmission member and which are disengageable to disconnect said first power transmission means and said transmission member, hydraulically operated motor means for effecting the engagement and disengagement of said friction members, fluid pressure supply means, and valve means operatively connected to said clutch means and movable by said clutch means to a first position to connect said fluid pressure supply means to said motor means to effect engagement of friction members so that said first and second power transmitting means drive said transmission member in a first direction, and mounting means having arcuately spaced contact faces between said transmission member and said valve means to permit said second power transmitting means to move said transmission member relative to said valve means to another position to block said fluid pressure supply means and to form a passage therebetween to exhaust fluid from said motor means thereby effecting the disengagement of said friction members so that only said second power transmitting means drives said transmission member in said first direction.

5. The power transmission of claim 4, said clutch means having input and output hub members, and friction means carried by one of said hub members for contacting the other of said hub members to permit one of said hub members to move the other of said hub member when said friction means are disengaged to thereby move said valve means to said first position.

6. The power transmission of claim 4, said clutch means having input and output hub members, said friction means being a multi-plate clutch pack and formed by a first set of plates splined to said input hub and a second of said plates interleaved with said first set of plates and splined to said output hub, said sets of plates providing drag means to permit one of said hub members to move the other of said hub members and thereby move said valve means to said first position.

7. In a power transmission having an input and an output, a torque converter having a pump operatively connected to said input and having first and second turbines and a stator, an intermediate shaft, transmission means operatively connecting said intermediate shaft to said output, a first pair of meshing gears providing a first gearset operatively connected to said first turbine providing a low speed ratio, a second pair of meshing gears providing a second gearset operatively connected to said second turbine and to said intermediate shaft to provide a high speed ratio, a clutch for operatively connecting and for disconnecting the output of said first gearset and said intermediate shaft, said clutch means having input and output hub members and engageable and disengageable friction plates, cooperating spline means on said intermediate shaft and said output hub member having spaced contact faces which are mutually engageable for mounting said output hub member on said intermediate shaft to provide a fluid passage when said faces are spaced and to provide a drive connection when said faces are engaged, fluid operated motor means for effecting the engagement and disengagement of said friction plates, a fluid supply line in said intermediate shaft and valve means operatively connected to said output hub member and responding to limited relative movement of said intermediate shaft and said output hub member in one direction to hydraulically connect said motor means to said supply line and responding to limited relative movement of said intermediate shaft and said output hub member in an opposite direction to block said supply line and to exhaust fluid from said motor means through said passage and thereby effect clutch disengagement.

References Cited

UNITED STATES PATENTS

| | | | |
|---|---|---|---|
| 3,107,765 | 10/1963 | Davies | 192—56F |
| 3,150,541 | 9/1964 | Flinn | 74—677 |
| 3,182,777 | 5/1965 | Browning et al. | 192—56F |
| 3,256,751 | 6/1966 | Tuck et al. | 74—718 |

FOREIGN PATENTS

| | | | |
|---|---|---|---|
| 726,652 | 10/1942 | Germany | 192—56 |
| 1,209,526 | 9/1959 | France | 192—56 |

ARTHUR T. McKEON, Primary Examiner

U.S. Cl. X.R.

74—677, 718; 192—56